No. 853,523. PATENTED MAY 14, 1907.
S. B. STARK.
HARROW.
APPLICATION FILED MAR. 22, 1906.
2 SHEETS—SHEET 1.
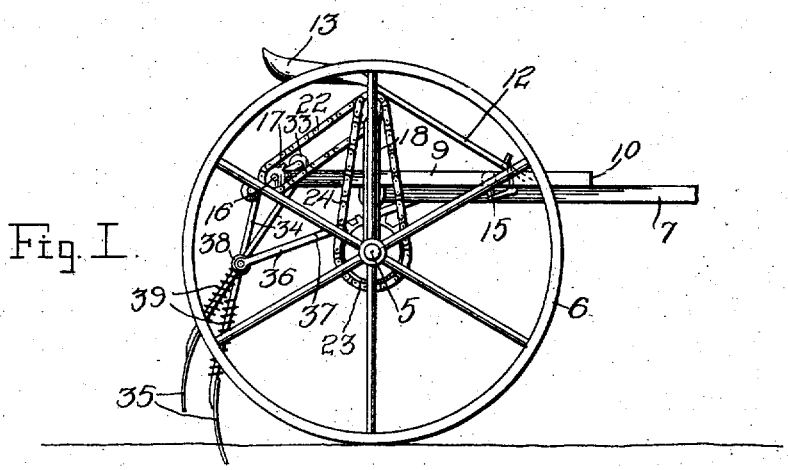
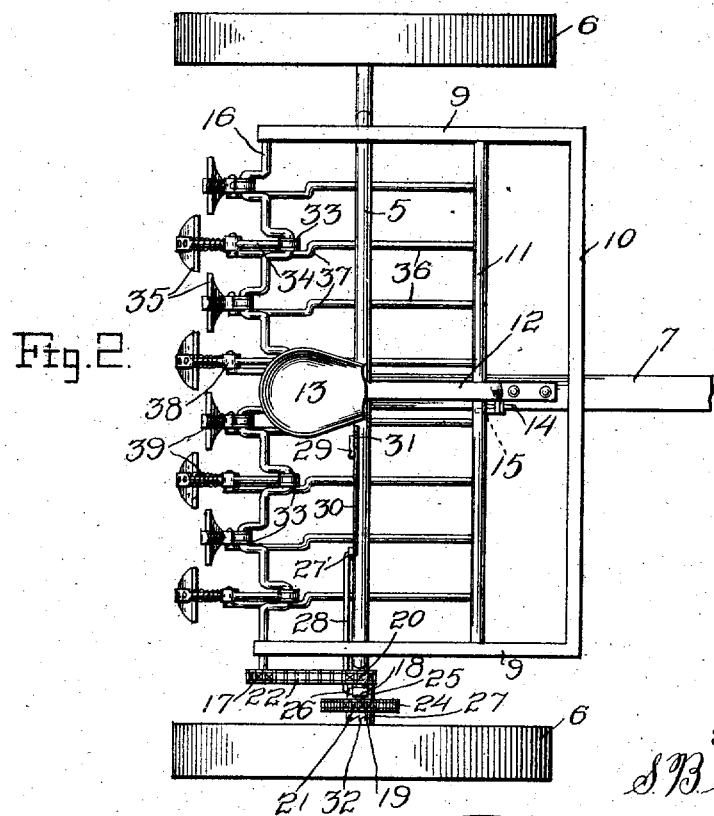
Witnesses
C. K. Reichenbach
F. C. Jones
Inventor
S. B. Stark
By Chandler & Chandler
Attorneys

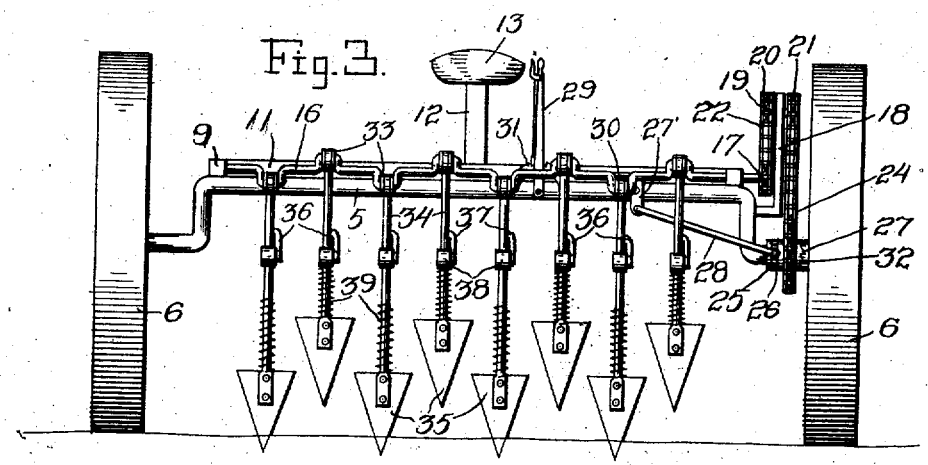
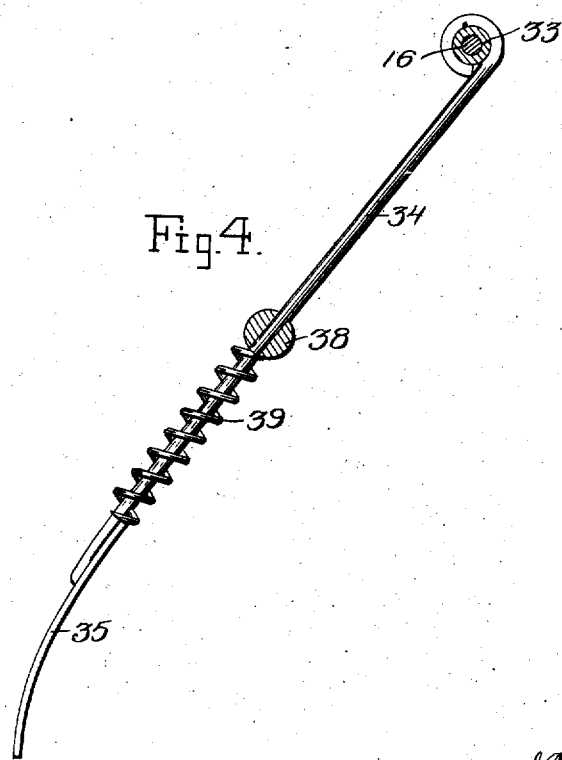

UNITED STATES PATENT OFFICE.

SUMMERFIELD B. STARK, OF NEWSITE, ALABAMA.

HARROW.

No. 853,523.     Specification of Letters Patent.     Patented May 14, 1907.

Application filed March 22, 1906. Serial No. 307,547.

*To all whom it may concern:*

Be it known that I, SUMMERFIELD B. STARK, a citizen of the United States, residing at Newsite, in the county of Tallapoosa, State of Alabama, have invented certain new and useful Improvements in Harrows; and I do hereby declare the following to be a full, clear, and exact description of the invention, such as will enable others skilled in the art to which it appertains to make and use the same.

This invention relates to cultivators and has for its object to provide an implement of this character which will be efficient in action and which may be used to chop corn stalks when so desired.

With the above and other objects in view, the invention consists in the construction and arrangement of parts, shown in the accompanying drawings, in which:

Figure 1 is a side elevation of the invention. Fig. 2 is a top plan view thereof. Fig. 3 is a rear view, and, Fig. 4 is a detail view of one of the choppers and its associated parts.

Referring to the drawings, the numeral 5 denotes the axle of the implement and 6 the ground wheel supporting the same. Secured at its rear end to the axle 5 is a tongue 7. Pivotally mounted upon the axle 5 is a frame including side bars 9 and cross-bars 10 and 11, the bar 10 connecting the forward ends of the side bars and the bar 11 connecting the said side bars intermediate their ends.

Extending upwardly from the rear end of the tongue 7 is a seat standard 12 upon the upper end of which is mounted a seat 13 and secured to the side of the tongue 7 is a segmental rack 14. Pivoted to the tongue in position to co-operate with the segmental rack 14 is a foot lever which is substantially in the form of a bell crank lever and connecting one arm of the bell crank lever and the bar 11 of the frame, is a link 15, it being understood that movement of the foot lever will vary the pitch of the frame.

Mounted in the rear ends of the side members 9 is a crank shaft 16 provided at one of its ends with a sprocket gear 17. A standard 18 extends upwardly from the axle 5 and mounted in a bearing at the upper end of the standard 18 is a shaft 19 which extends upon opposite sides of the said bearing and upon which are mounted sprocket gears 20 and 21. Connecting the sprocket gears 17 and 20 is a sprocket chain 22 and connecting the sprocket gear 21 and a sprocket gear 23 loosely mounted on the axle 5 is a chain 24. The hub of the sprocket gear 23 is in the form of a sleeve 25 having an annular groove 26 and a clutch face 27. Pivoted to the axle 5 is a lever 27' to the lower end of which is pivoted one end of a rod 28 which is provided at its opposite end with a yoke member engaged in the groove in the sleeve 25. Pivoted to the upper end of the lever 27' at one of its ends and at the other of its ends to the lower end of a lever 29 is a rod 30 whereby the lever 27' may be rocked to move the sprocket 23 along the axle 5. The lever 29 is held in its adjusted position by means of a segmental rack 31. The hub of the ground wheel 6 adjacent the sprocket 23 is provided with a clutch face 32 for engagement with the clutch face on the sleeve 25, it being understood that the crank shaft is by this means rotated.

Mounted upon each of the crank portions of the crank shaft 16 is an annularly grooved anti-friction roller 33 and engaged in the groove of each roller is the looped end of a rod 34 upon the lower end of which is a cultivator blade 35. Rigidly connected at their forward ends to the bar 11 of the frame are guide rods 36 which are in alinement with the rods 34 and which are bent laterally and thence rearwardly at their middle as at 37 to allow for free movement of the crank shaft. Guide sleeves 38 are carried at the rear ends of the rods 36 for oscillatory movement with respect thereto and through the said guide sleeves 38 are engaged the rods 34. Disposed upon the rods 34 intermediate the blades 35 and the sleeves 38 are springs 39 which cushion the movement of the rods 34 during their reciprocatory movement.

What is claimed is:—

1. An implement of the class described comprising a frame arranged for travel, a crank shaft journaled in the frame, means for rotating the crank shaft, rods pivotally connected with the crank shaft, blades carried by the rods, a fixed shaft mounted in the frame and forwardly of the rock shaft, arms secured at their rear ends to the fixed shaft, said arms being extended rearwardly and being offset adjacent the rods carrying the blades, guide sleeves engaged upon the rods and connected with the rear ends of the arms for oscillatory movement with respect thereto, and a spring disposed upon the rods intermediate the said sleeve and the said blades.

2. An implement of the class described comprising a frame arranged for travel, a crank shaft journaled in the frame, means for rotating the crank shaft, rods pivotally connected with the crank shaft, blades carried by the rods, fixed arms carried by the frame, guide sleeves carried by the arms for oscillatory movement, said sleeves being arranged to slidably receive the first named rods, and springs disposed upon the rods and intermediate the said sleeves and the said blades.

In testimony whereof, I affix my signature in presence of two witnesses.

SUMMERFIELD B. STARK.

Witnesses:
J. I. DONEGAN,
J. WILSON NOLEN.